L. R. SHADWICK.
COMBINATION AIR AND HAND POWER JACK.
APPLICATION FILED FEB. 18, 1919.
1,315,871.
Patented Sept. 9, 1919.
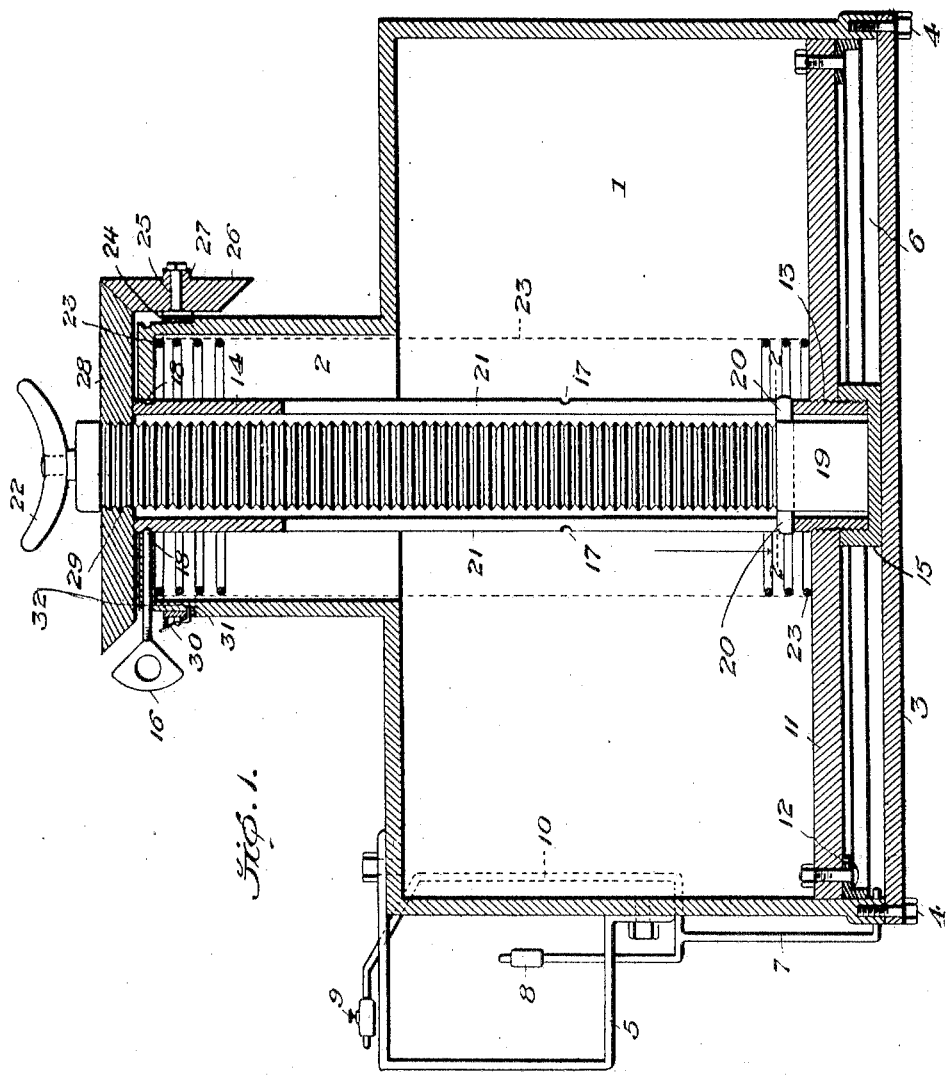
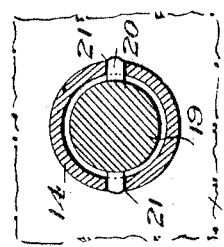
Inventor
Lawrence R Shadwick
By Frank C. Gore
his Attorney
Witness

UNITED STATES PATENT OFFICE.

LAWRENCE R. SHADWICK, OF PALESTINE, ILLINOIS.

COMBINATION AIR AND HAND POWER JACK.

1,315,871.  Specification of Letters Patent.  Patented Sept. 9, 1919.

Application filed February 18, 1919. Serial No. 277,722.

*To all whom it may concern:*

Be it known that I, LAWRENCE R. SHADWICK, a citizen of the United States, residing at Palestine, in the county of Crawford and State of Illinois, have invented certain new and useful Improvements in Combination Air and Hand Power Jacks, of which the following is a specification.

This invention relates to combination air and hand power jacks adapted for either air or manual operation, at will.

The invention contemplates the provision of a combined air operated and hand operated lifting jack wherein a cylinder and piston are combined in a novel manner with the lifting stem or standard and with gearing and a screw feed, enabling either hand power or air operation to be resorted to.

Further, invention resides in novel means for quickly retracting the piston; still further in an improved arrangement whereby the stem or shank may be extended to different heights, according to the use to which the jack is to be put; and, also, an improved locking means for the piston and a novel mounting for the driving, hand operated, gearing, whereby it may be conveniently turned regardless of the position of the jack and the limited space in which it may be necessary to place and operate the jack when operated by hand.

The embodiment of the invention which is hereinafter set forth and which is shown in the accompanying drawings, is susceptible of modification within the spirit of the invention and is, therefore, to be considered as illustrative, rather than restrictive, of the invention.

In the accompanying drawings,

Figure 1, is a vertical section, certain parts being in full lines, and

Fig. 2, a cross-section on line 2—2, Fig. 1.

The jack has a cylinder 1 and spring box 2 formed in one piece, or securely connected together, a head 3 being secured by lag screws 4. A suitable handle 5 is provided to enable the jack to be readily moved or carried about.

Air is admitted to the space 6 below the piston, through a pipe 7, connected with any suitable air inlet valve 8 which controls the admission of air pressure for the purpose of operating the jack. A release valve 9 is connected by a pipe 10 to the pipe 7 and is used to exhaust the air from the space 6.

The valves 8 and 9 are located convenient to the handle 5 so that they may be readily manipulated. If preferred the valves 8 and 9 could be combined in the form of a three-way valve, and the pipe 10 dispensed with.

Operable within the cylinder 1 is a piston 11 which has suitable packing 12. Screwed into the piston at 13 is a tubular stem 1 which is provided with a cap 15 below the piston. The cap, by abutting the head 3, limits the descent of the piston and insures maintenance of the space 6 when the piston is down. The stem 14 is slidable through the upper end of the spring box 2.

A clamping or set screw 16 is adapted to have its tip screwed into a groove 17 to hold the load, once the piston 11 and stem 14 have been elevated. The set screw may be screwed into another groove 18 when the piston is down and the jack is being operated by hand power, this being done for the purpose of preventing the stem 14 from rotating.

Located within the stem 14 is an externally screw threaded shank or stem 19 which has a cross pin 20 whose ends are slidable in vertical slots 21 in the sides of the stem 14. When air is used for operating the jack, the shank 19 and hollow stem 14 move as a unit. When the jack is operated by hand power, the shank 19 moves vertically within the stem 14, the cross pin 20 sliding in the slots 21 and preventing the shank 19 from rotating. Any suitable head 22 may be carried by the upper end of the shank 19.

The stem 14 is surrounded by an expansion coil spring 23 which fits within the spring box 2 and against the upper end thereof; the lower end of the spring bears on the piston 11. When the piston rises, due to admission of air into the space 6, the spring 23 is compressed. When the air pressure is released, the spring promptly forces the piston and stem 14 to the bottom of the cylinder 1, thus making the jack ready for any future desired operation.

Rotatably mounted on the upper end of the box 2 is a collar or band 24 which has a stub shaft 25. Journaled on the stub shaft is a pinion 26 provided with a polygonal hub 27 for the application of a brace-crank such as is commonly used by those operating automobiles for the purpose of tightening nuts, etc. Preferably the hub 27 will be of a size and shape adapting it for the application of standard size brace-cranks so that the pinion 26 can be rapidly and easily turned by such a brace-crank.

Located on top of the spring box 2 is a gear 28 which has internal screw threads 29 engaging the screw threads of the shank 19. On turning the gear 26, the rotation of gear 28 will cause the shank 19 to be fed upwardly or downwardly. As the cross pin 20 slides in the slots 21, there will be no rotation of the shank 19. The mounting of the pinion 26 on a rotatable band or sleeve 24 enables the pinion to be shifted to any position which may be convenient for operation and consequently the jack is adapted for use in situations where space is limited.

When the jack is to be operated by air, the valve 8 is opened to admit air pressure below the piston 11. The piston 11, stem 14, shank 19, and gear 28 all rise as a unit. Should it be desired to still further extend the jack, the gear 28 may be rotated around the shank 19. A suitable hand brace or crank may then be used to turn the pinion 26 and, while the screw 16 is engaged with the groove 17, the shank 19 may be extended in relation to the stem 14 until the desired height is reached.

On the release of the air by opening the valve 9, the spring 23 quickly lowers the parts.

The shank 19 may be raised when the piston 11 is at the bottom of the cylinder 1, by the application of a suitable brace or crank to the pinion 26 to cause rotation of gear 28, whereupon the shank 19 will be fed upwardly in relation to the stem 14, the pin 20 then sliding in the slots 21.

When the jack is operated by hand, to prevent possible rotation of band 24, any suitable locking means may be provided therefor as, for instance, a spring-actuated dog 30 whose point 31 may enter any one of a series of holes 32 in box 2.

What I claim is:—

1. A combination air operated and hand power jack comprising a piston and cylinder, means for admitting air to the piston and cylinder and releasing it therefrom, a stem carried by the piston, a screw threaded shank carried by the stem and adapted for extension in relation thereto, a gear having a screw threaded engagement with the shank, an operating pinion meshing with the gear and adapted for the application of power to drive said gear, and a shiftable mounting for said pinion whereby the pinion may be moved to different desired positions for operation of said gear.

2. A lifting jack having a screw threaded load-supporting shank, a gear having a screw threaded engagement with said shank and adapted by its rotation to elevate or lower the shank, a pinion for driving said gears and a shiftable mounting for said pinion whereby it may be disposed in different desired positions in relation to the gear.

3. A lifting jack provided with a load-supporting screw threaded shank, a frame, or the like, which carries said shank, a gear having a screw threaded engagement with the shank whereby, on rotating said gear, the shank will be raised or lowered, a collar rotatably mounted on the frame or the like, and a driving pinion carried by said collar and meshing with the gear, said collar mounting said pinion in planetary relation to the gear so that the pinion may be disposed in any desired position for the application of power thereto.

In testimony whereof I affix my signature.

LAWRENCE R. SHADWICK.